(12) United States Patent
Hanabusa et al.

(10) Patent No.: US 10,890,537 B2
(45) Date of Patent: Jan. 12, 2021

(54) APPEARANCE INSPECTION DEVICE, LIGHTING DEVICE, AND IMAGING LIGHTING DEVICE

(71) Applicant: SERENDIPITY Co., Ltd, Tokyo (JP)

(72) Inventors: Shinichi Hanabusa, Tokyo (JP); Yusuke Omori, Tokyo (JP); Hayato Akuzawa, Tokyo (JP)

(73) Assignee: SERENDIPITY CO., LTD, Tokyo (JP)

( * ) Notice: Subject to any disclaimer, the term of this patent is extended or adjusted under 35 U.S.C. 154(b) by 0 days.

(21) Appl. No.: 16/487,271

(22) PCT Filed: Aug. 1, 2017

(86) PCT No.: PCT/JP2017/027908
§ 371 (c)(1),
(2) Date: Aug. 20, 2019

(87) PCT Pub. No.: WO2018/150607
PCT Pub. Date: Aug. 23, 2018

(65) Prior Publication Data
US 2020/0018707 A1     Jan. 16, 2020

(30) Foreign Application Priority Data
Feb. 20, 2017  (JP) .................... 2017-028787

(51) Int. Cl.
*G01N 21/88*    (2006.01)
*G06T 7/00*     (2017.01)
*G01N 21/956*   (2006.01)

(52) U.S. Cl.
CPC ..... *G01N 21/8806* (2013.01); *G01N 21/8803* (2013.01); *G01N 21/956* (2013.01);
(Continued)

(58) Field of Classification Search
CPC .......... G01N 21/8806; G01N 21/8803; G01N 21/956
(Continued)

(56) References Cited

U.S. PATENT DOCUMENTS 6,445,452 B1   9/2002  Kondou et al.
6,452,671 B1   9/2002  Uda et al.
(Continued)

FOREIGN PATENT DOCUMENTS

JP    11-83751      3/1999
JP    2000-124700   4/2000
(Continued)

OTHER PUBLICATIONS

Office Action issued in Japan Counterpart Patent Appl. No. 2018-534759, dated Jul. 30, 2019 (with English translation).
(Continued)

*Primary Examiner* — Hung Nguyen
(74) *Attorney, Agent, or Firm* — Greenblum & Bernstein, P.L.C.

(57) ABSTRACT

An imaging lighting device of an appearance inspection device images a product T. A controller of the appearance inspection device causes an imaging control unit to obtain an image, a preprocessing unit to position the product and remove background of the product, a color space processing unit to perform color space processing for emphasizing a defect such as a flaw and a dent of the product and to create a color space processing image, and an assessment unit to make an quality assessment of the product using a learned model obtained through machine learning of quality assessment of the product using the color space processing image.

21 Claims, 11 Drawing Sheets

(52) U.S. Cl.
CPC .... *G06T 7/0002* (2013.01); *G01N 2021/8816* (2013.01); *G01N 2021/8845* (2013.01)

(58) Field of Classification Search
USPC ..................................................... 355/237.2
See application file for complete search history.

(56) References Cited

U.S. PATENT DOCUMENTS

| | | | |
|---|---|---|---|
| 6,496,272 B1 * | 12/2002 | Watanabe | G01N 21/8806 356/614 |
| 6,533,429 B2 | 3/2003 | Yoneda | |
| 2002/0093809 A1 | 7/2002 | Yoneda | |
| 2010/0128968 A1 | 5/2010 | Cherbis et al. | |

FOREIGN PATENT DOCUMENTS

| | | |
|---|---|---|
| JP | 2000-258353 | 9/2000 |
| JP | 2001-41900 | 2/2001 |
| JP | 2001-141657 | 5/2001 |
| JP | 2002-214143 | 7/2002 |
| JP | 2003-247953 | 9/2003 |
| JP | 2004-191112 | 7/2004 |
| JP | 3140462 | 3/2008 |
| JP | 2009-36710 | 2/2009 |
| JP | 2010-249547 | 11/2010 |
| JP | 2011-191252 | 9/2011 |
| JP | 2011-214903 | 10/2011 |
| JP | 2012-112688 | 6/2012 |
| JP | 2013-2985 | 1/2013 |

OTHER PUBLICATIONS

Official Communication issued in International Bureau of WIPO Patent Application No. PCT/JP2017/027908, dated Nov. 7, 2017 (with English translation).
IPRP issued in International Bureau of WIPO Patent Application No. PCT/JP2017/027908, dated Aug. 20, 2019 (English translation).

* cited by examiner ial products, an inspection process, for example, to detect defective products is generally carried out after manufacturing processes on the production line.

APPEARANCE INSPECTION DEVICE, LIGHTING DEVICE, AND IMAGING LIGHTING DEVICE

TECHNICAL FIELD

The present disclosure relates to an appearance inspection device that makes a quality assessment of an object based on its appearance, a lighting device to light up the object, and an imaging lighting device using the lighting device.

BACKGROUND ART

In production of industrial products, an inspection process, for example, to detect defective products is generally carried out after manufacturing processes on the production line. Examples of a method of inspection include an automatic inspection automatically performed by machines and visual inspection (appearance inspection) performed by operators. Visual inspection relying a labor-intensive method is still widely employed in many production lines, and that is why various inspection devices are developed for automation of the process.

For example, Patent Document 1 describes a method of defect inspection that includes steps of: imaging a product to be inspected (a test object) under different optical conditions to obtain a plurality of inspection images, creating a plurality of inspection frequency images by conducting the Fourier transform on the obtained inspection images, causing a neural network to process the created inspection frequency images as input signals, and making a quality assessment of the product based on output signals from the neural network.

Patent Document 2 describes a metal surface quality evaluation method to determine whether the quality of a test object (an object) to be good or defective, by the steps of: capturing an image of the surface of the test object and calculating color component information of a plurality of pixels included in the image; calculating the thickness of an oxide film corresponding to a pixel included in the metal surface image by comparing previously measured relation data, indicating relation between a trajectory of color component information of the pixel on the color space and the thickness of the oxide film on the metal surface measured at the position where the color component information is obtained, with the position of the color component information on the color space; calculating determinant an amount of characteristic for each thickness of the oxide film; and comparing the determinant amount of characteristic with the previously measured good-product amount of characteristic relation, which is obtained through machine learning of a metal amount of characteristic indicating good quality and defective quality of the metal.

Patent Document 3 describes a board inspection device that inspects the conditions of mounting or soldering of parts mounted or soldered on the printed wiring board. Patent Document 3 describes a configuration that includes an annular upper lighting device that irradiates a board surface with monochromatic light from above the board through an upper diffusion plate, an annular lower lighting device that irradiates the board surface with white light from an obliquely lateral location through a lower diffusion plate, and a camera disposed above the upper lighting device and the lower lighting device in the center axis direction. The camera captures an image while the upper lighting device and the lower lighting device are on, and conditions of mounting and soldering of the parts are evaluated using the captured image.

Patent Document 4 describes an appearance inspection device that detects the outer shape of a liquid crystal panel, and cracks and chips on the surface and end surfaces thereof. Patent Document 4 describes such a configuration that includes an upper ring light, a middle ring light, and a lower ring light and a charge-coupled device (CCD) camera disposed above the ring lights in the center axis direction. With each ring light shining, the CCD camera captures an image. Light rays from the upper ring light allow detection of flaws, chips, and cracks on the surface of the liquid crystal panel, and light rays from the middle and the lower ring lights allow detection of chips and cracks on the end surfaces and lower edges of the liquid crystal panel.

CITATION LIST

Patent Document

PATENT DOCUMENT 1: Japanese Unexamined Patent Publication No. 2004-191112
PATENT DOCUMENT 2: Japanese Unexamined Patent Publication No. 2011-191252
PATENT DOCUMENT 3: Japanese Utility Model Registration No. 3140462
PATENT DOCUMENT 4: Japanese Unexamined Patent Publication No. 2003-247953

SUMMARY OF THE INVENTION

Technical Problem

The method described in Patent Document 1, which obtains an amount of characteristic from a plurality of inspection frequency images created by conducting the Fourier transform or affine transform on inspection images of a test object, and the method described in Patent Document 2, which obtains the determinant amount of characteristic for the thickness of an oxide film based on color component information, have difficulty in exactly defining an amount of characteristic that enables discrimination between good and defective products. Furthermore, these methods cannot evaluate a defect not included in a predetermined amount of characteristic.

Printed circuit boards and liquid crystal panels given as test objects in above Patent Documents 3 and 4 are precision products, manufactured with accuracy in the first place. Those products are less likely to be damaged in the manufacturing processes, and flaws of the product can be lit by simply lighting the object as described in Patent Documents 3 and 4. Furthermore, inspection of such precision products is comparatively easy, because they can be immediately determined to be defective if damaged, regardless of the level of the damage.

With regards to metal parts such as a plate of a vehicle brake pad, various types of defect such as a crack, chip, scratch, cut, and dent, are likely to be caused to a certain extent during the manufacturing processes. Methods of evaluation as described in Patent Documents 1 and 2 or methods of lighting of Patent Documents 3 and 4 are not effective in exactly detecting such defects. Moreover, even if a defect is detected on the product, the product is not always determined to be defective depending on the level of the defect.

There is therefore difficulty in detecting each type of defect and exactly distinguishing between good and defective products. Since the products are continuously conveyed on the production line, it is quite difficult to inspect the products without stopping the flow of the line.

Operators therefore visually inspect each product; however, inspection by an operator is largely dependent on his/her experience, which causes inconsistency in accuracy of inspection and makes the work inefficient.

To overcome the above problems, it is an object of the present disclosure to provide an appearance inspection device capable of detecting various types of defect of an object and carrying out more accurate and efficient inspection at the visual inspection level. The present disclosure further aims to provide a lighting device capable of lighting various types of defect of an object and an imaging lighting device capable of imaging such defects lit up by the lighting device.

Solution to the Problem

In order to carry out the above attempt, a lighting device of the present disclosure as a lighting device to light up an object includes: a first cylindrical body having an inner light-reflective surface allowing repeated reflection inside the first cylindrical body and disposed such that an object is located on an extension of the center axis; a first light source annularly arranged on the inner light-reflective surface of the first cylindrical body and configured to emit a first light ray; a second cylindrical body disposed closer to the object with respect to the first cylindrical body and formed in a cylindrical shape coaxial with the first cylindrical body; and a second light source annularly arranged on the inner surface of the second cylindrical body and configured to emit a second light ray. The object is irradiated with surface light with coherency, which is generated by repeated reflection of the first light ray, emitted from the first light source, inside the first cylindrical body, and irradiated with direct light of the second light emitted from the second light source and with reflection light of the second light ray reflected inside the second cylindrical body.

Advantages of the Invention

The appearance inspection device of the present disclosure using the above means is capable of detecting various types of defect of an object and performing accurate, quick, and automatic inspection at the visual inspection level. The appearance inspection device of the present disclosure using the above means is capable of lighting various defects of the object. The appearance inspection device of the present disclosure using the above means is further capable of imaging various defects of the object lit up by a lighting device.

DESCRIPTION OF EMBODIMENTS

Embodiments of the present disclosure will be described in detail below with reference to the drawings.

Figure 1:
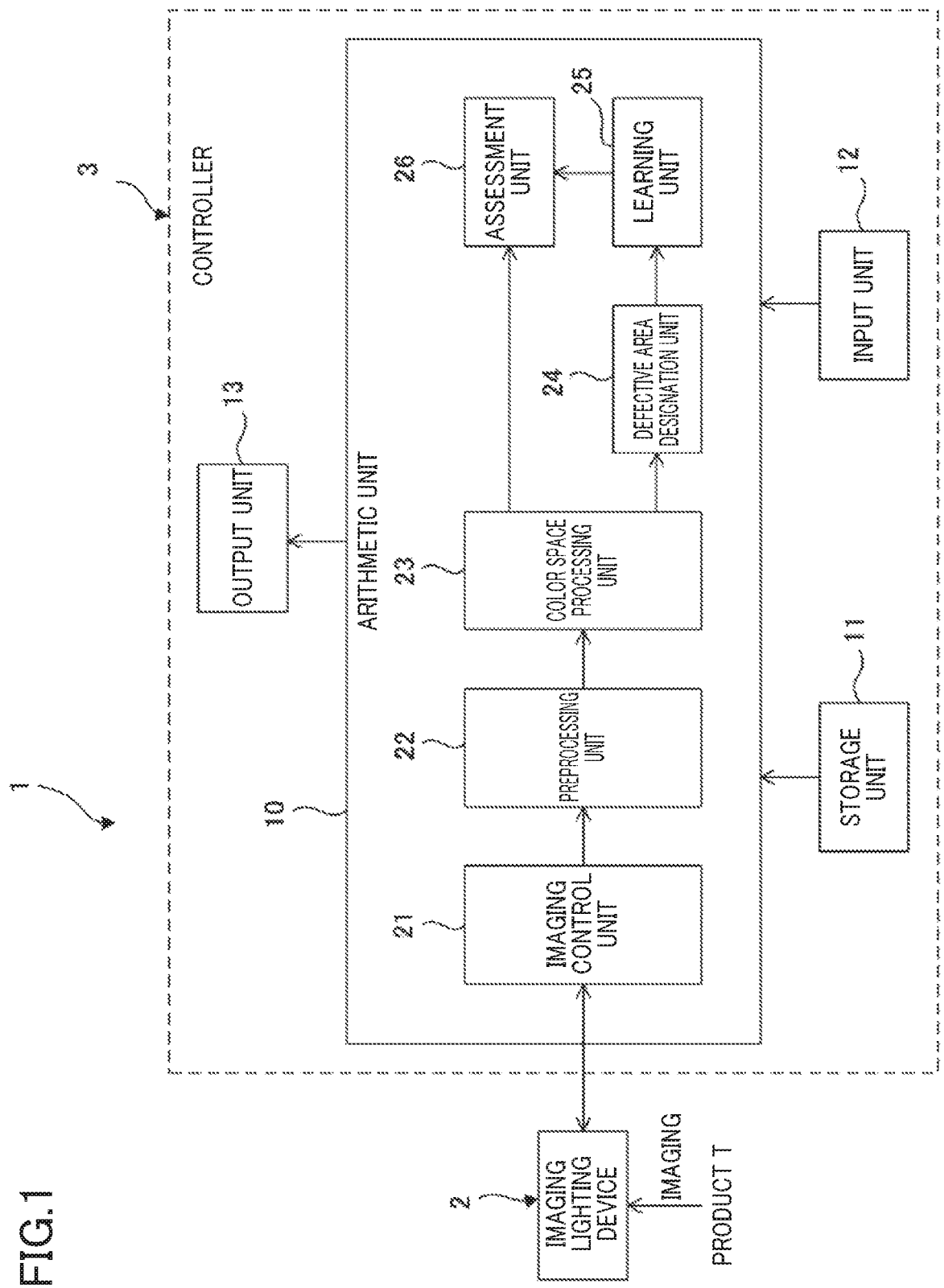
FIG. 1 is a block diagram of an overall configuration of an appearance inspection device according to an embodiment of the disclosure.

FIG. 1 is a block diagram of an overall configuration of an appearance inspection device according to an embodiment of the present disclosure.

As illustrated in FIG. 1, an appearance inspection device 1 mainly includes an imaging lighting device 2 that captures an image of a product T (an object) as a test object while lighting up the product T, and a controller 3 that conducts predetermined inspection processing including, for example, a quality assessment, based on the captured image data. The configuration of the imaging lighting device 2 will be described later.

As illustrated in FIG. 1, the controller 3 is a personal computer including an arithmetic unit 10 such as a central processing unit (CPU), a storage unit 11 such as a memory and a hard disk, an input unit 12 such as a keyboard and a mouse, and an output unit 13 such as a display.

The arithmetic unit 10 causes processing functions, each of which is illustrated in a block, to be executed in accordance with a computer program for inspection stored in the storage unit 11. The arithmetic unit 10 includes an imaging control unit 21 (an image input unit), a preprocessing unit 22, a color space processing unit 23, a defective area designation unit 24, a learning unit 25, and an assessment unit 26. In the arithmetic unit 10, mainly the imaging control unit 21, the preprocessing unit 22, the color space processing unit 23, the defective area designation unit 24, and the learning unit 25 learn to assess the quality of the product T, while the imaging control unit 21, the preprocessing unit 22, the color space processing unit 23, and the assessment unit 26 make a quality assessment of the product T.

The imaging control unit 21 controls imaging of the product T by the imaging lighting device 2, obtains captured image data, and transmits the data to the preprocessing unit 22.

The preprocessing unit 22 performs image processing on the obtained image data, which is a previous step for learning and assessment. For example, the preprocessing unit 22 recognizes the outer shape of the product T in the captured image data, positions the product T at substantially the same location as a predetermined reference image, and removes the background.

The color space processing unit 23 performs color space processing, more specifically, color space transform (which may be referred to as color profile transform or spectrum separation processing) on the image data, positioned and having the background removed, and creates a plurality of color space processing images from one image. The color space processing images present various types of defect of the product T. A gamut including a band of wavelengths causing optical interference depending on the type of defect is selected and used to compose the color space processing image. For example, if the defect is a flaw in a V-shaped groove, blue wavelengths cause a considerable change in the contrast of an image. A false contour is generated at the interface of the flaw because of the changes in the luminance, and false color components of the contour are emphasized on the image. If the defect is a dent or the like defect, such an image is created that emphasizes the circumstance where multi-hue diffuse reflection is spread in a patchy pattern on an achromatic color plane having a uniform contrast, due to the different surface reflection properties. In this manner, a band of wavelengths corresponding to the type of defect is emphasized and displayed.

Image data before undergoing the color space processing is not necessarily in the range of visible wavelengths. Even if the image data includes flaws and the like captured in the ultraviolet region and infrared region, the color space processing image is presented as a visible image by transforming the image data to the visible region on the color space.

The defective area designation unit 24 outputs the color space processing image created by the color space processing unit 23 to the output unit 13. The operator designates a defective area in the image with the input unit 12, and the defective area designation unit 24 creates defective-product training data. Specifically, rectangular grid regions are designated on the color space processing image, and a defective area is designated by the grid. A color space processing image with no defective areas designated is classed into good-product training data.

The defective product training data and the good-product training data created by the defective area designation unit 24 are stored in the storage unit 11. The defective-product training data and the good-product training data may be prepared in another place other than the controller 3.

The learning unit 25 learns to distinguish between good and defective conditions of the product T through machine learning (what is called, deep learning) based on the defective-product training data and the good-product training data created by the defective area designation unit 24 and stored in the storage unit 11, and creates a learned model. The created learned model is stored in a storage unit 11.

With reference to the learned model created by the learning unit 25 and stored in the storage unit 11, the assessment unit 26 assesses the product T, displayed on a color space processing image newly input from the color space processing unit 23, whether to be good or defective and outputs the result to the output unit 13.

The configuration of the imaging lighting device 2 will now be described.

Figure 2:
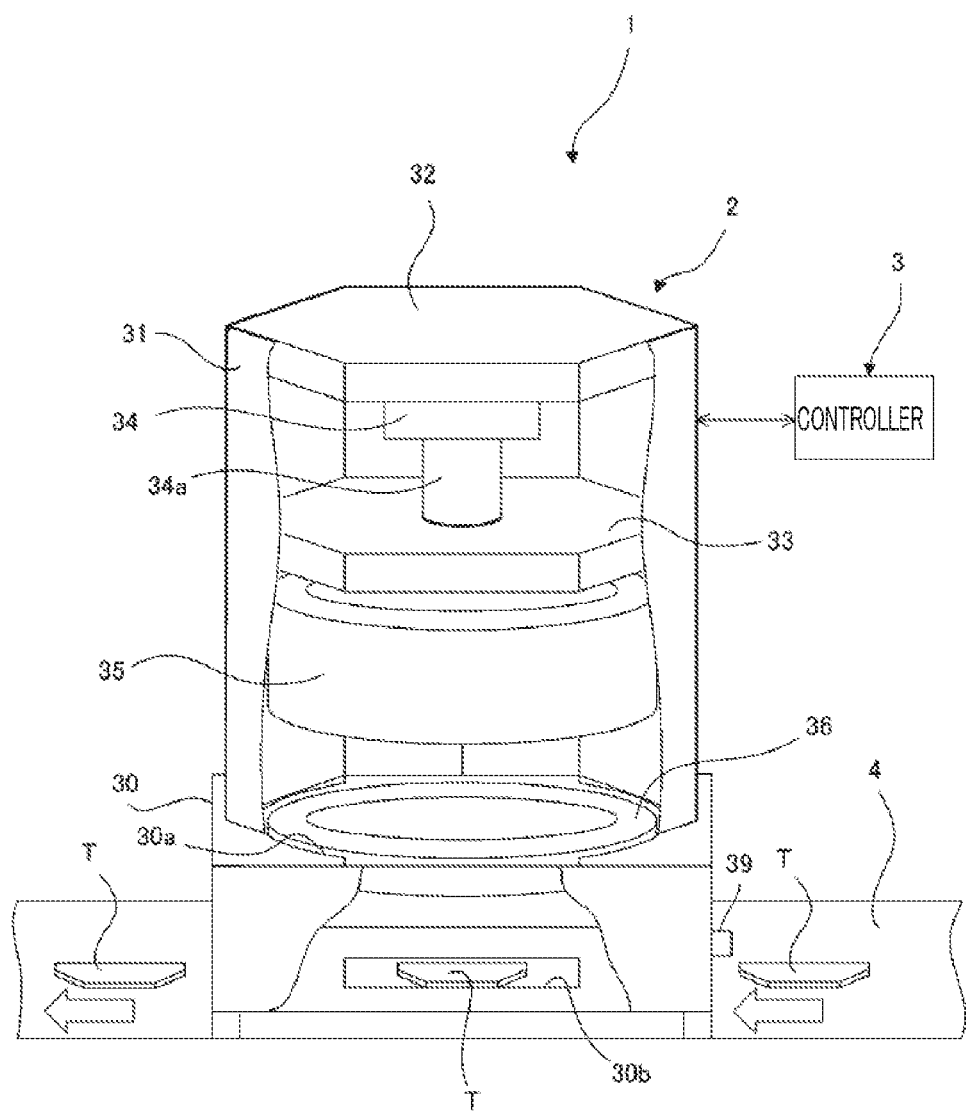
FIG. 2 is a structural view of an imaging lighting device a part of which is removed.
Figure 3:
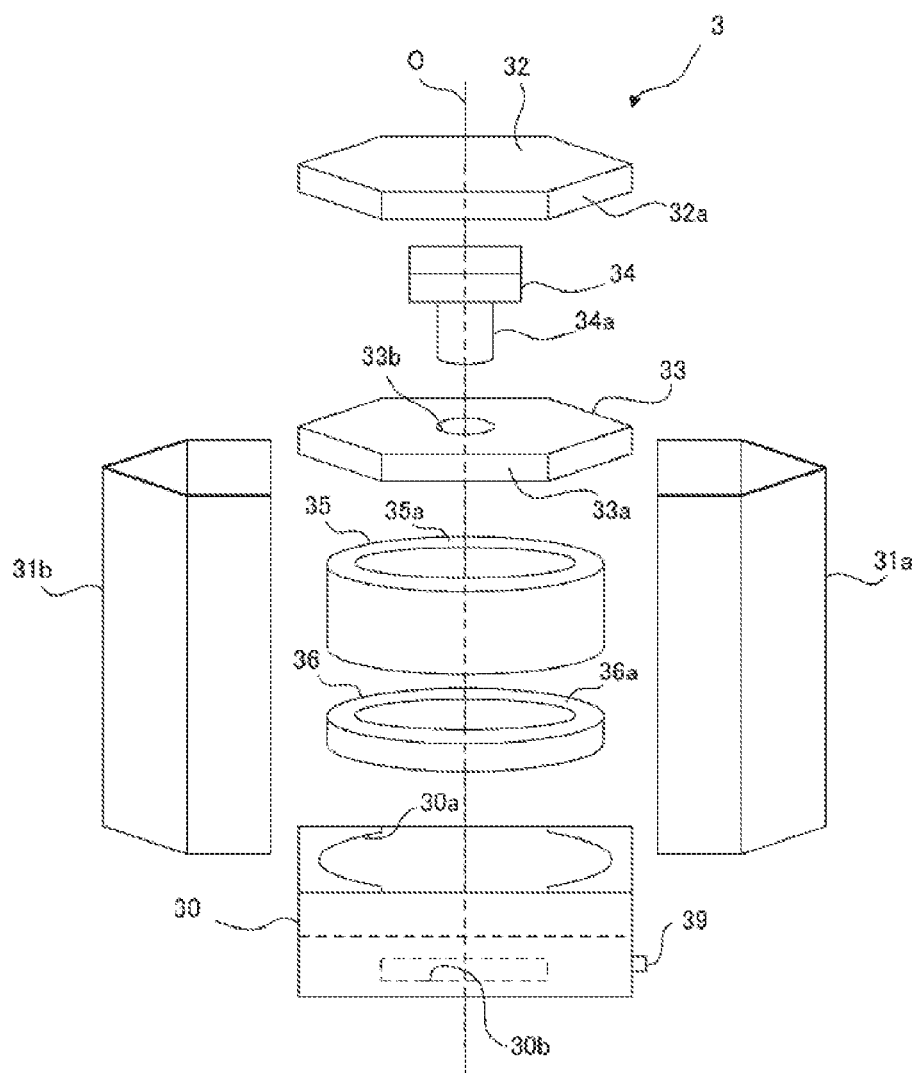
FIG. 3 is an exploded view of the imaging lighting device.
Figure 4:
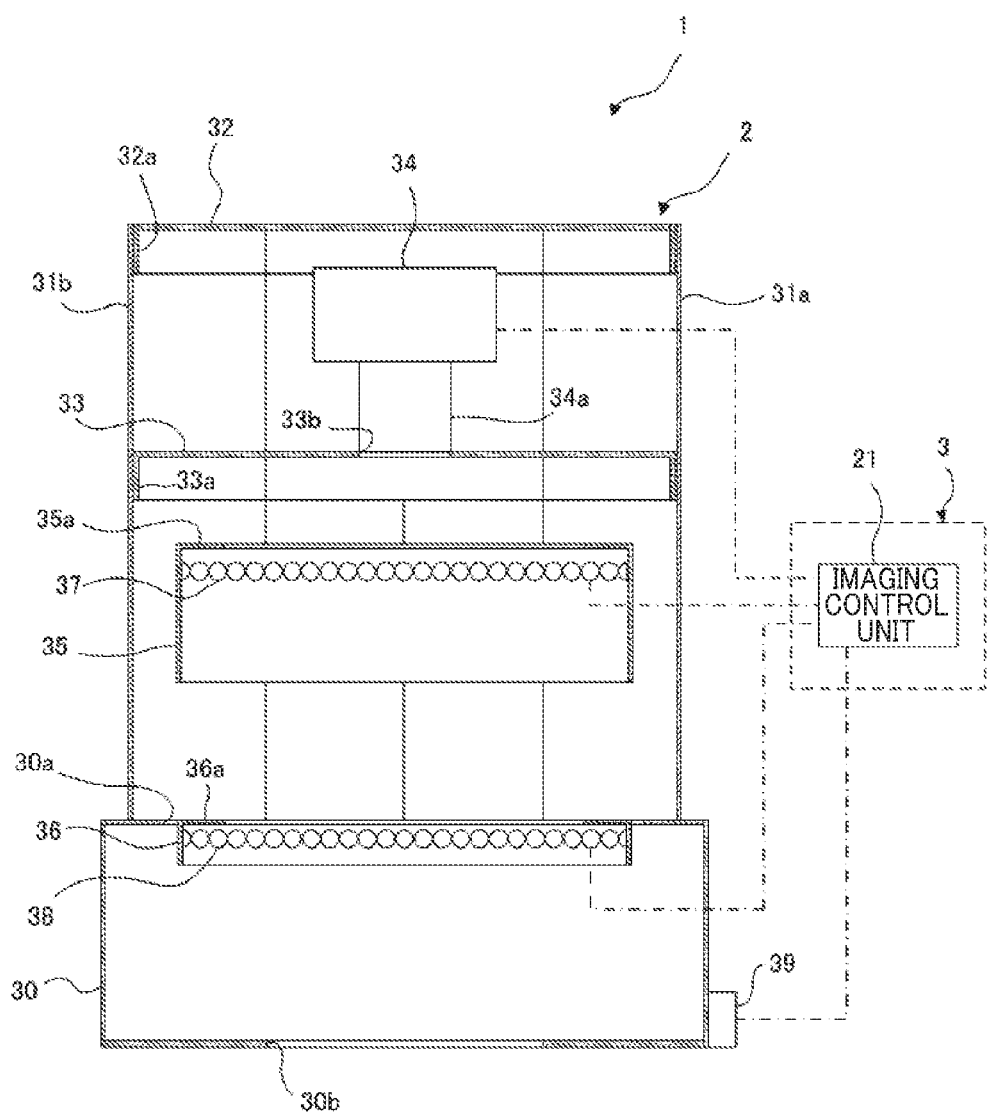
FIG. 4 is a vertical sectional view of the imaging lighting device.

FIG. 2 is an overall structural view of an imaging lighting device. FIG. 3 is an exploded view of the imaging lighting device. FIG. 4 is a vertical sectional view of the same. The configuration of the imaging lighting device will now be described with reference to the drawings.

As illustrated in FIG. 2, the imaging lighting device 2 (an imaging lighting unit) is disposed on a belt conveyor 4 (a conveyor unit) for conveying the product T to be inspected.

The product T of this embodiment is, for example, a metal part such as a plate of a vehicle brake pad. The product T is processed from a metal plate to a final product through production lines and conveyed to an inspection line equipped with the appearance inspection device 1.

The imaging lighting device 2 has such an outer shape that has a hexagonal tubular cover 31 vertically arranged on a rectangular parallelepiped chamber box 30. The cover 31 can be divided into right and left pairs (31a and 31b). A hexagonal top plate 32 is mounted on the upper opening of the cover 31 so as to close the upper opening.

An intermediate plate 33 similar in hexagonal shape to the top plate 32 is disposed under the top plate 32. Hexagonal tubular ribs 32a and 33a projecting downward are arranged around the peripheral edges of the top plate 32 and the intermediate plate 33. The intermediate plate 33 has a circular hole 33b at the center thereof.

The space between the top plate 32 and the intermediate plate 33 includes a camera 34 (an imaging unit). The camera 34 with a lens 34a is capable of imaging areas in the vertically downward direction through the circular hole 33b of the intermediate plate 33. The camera 34 is a digital camera with a large sensor having a length between opposite corners of over one inch. The camera 34 is capable of obtaining such image data that has no hotspots, has a resolution of over ten bits and a display resolution of over 20 million pixels, and is adapted to sensitivity distributions of color sensitivity possessed by a human eye, in other words, has the same color sensitive layers as those perceived by a human eye. The data format of the image data is not specifically designated. For example, RAW and JPEG data may be used. Various movable parts such as a shutter and a focus ring are set when the camera 34 is installed to the imaging lighting device 2. The camera 34 can structurally fix the movable parts after the setting so as to keep the parts from physical actions during imaging.

A first cylindrical body 35 is disposed under the intermediate plate 33. The first cylindrical body 35 is a cylinder having a center axis O arranged along the vertical direction, that is, a direction of imaging. The inner surface of the cylinder is a light-reflective silver surface that allows repeated reflection inside the cylindrical body. The diameter of the first cylindrical body 35 is at least larger than the product T, preferably, two to two and a half times as large as the length of the product T in the longitudinal direction. The length (the length of the cylinder) of the first cylindrical body 35 in the direction of center axis is preferably two thirds to one third of the diameter.

The first cylindrical body 35 has an annular rib 35a, projecting toward the center axis O, at the edge, of the first cylindrical body 35, closer to the camera (away from the object). The rib 35a has a black inner surface to reduce reflection of light.

A second cylindrical body 36 is located at a predetermined distance under the first cylindrical body 35 (located closer to the object). The distance between the first cylindrical body 35 and the second cylindrical body 36 is preferably in the range from the diameter to one third of the diameter of the first cylindrical body 35, more preferably, in the range from two thirds to one third of the diameter.

The second cylindrical body 36 is a cylinder coaxial with the first cylindrical body 35, and having the same diameter as that of the first cylindrical body 35. The length of the cylinder body is shorter than that of the first cylindrical body 35. The length of the second cylindrical body 36 in the direction of center axis is preferably two tenths to one tenth of the diameter of the same. The diameter of the second cylindrical body 36 needs to be larger than the product T, but may be smaller than the diameter of the first cylindrical body 35. The second cylindrical body 36 is located away from the product T by a distance equivalent to 15% to 20% of the diameter of the second cylindrical body 36.

The second cylindrical body 36 has an annular rib 36a, projecting toward the center axis, at the edge, of the second cylindrical body 36, closer to the camera (away from the object). The second cylindrical body 36 and the rib 36a have silver inner surfaces.

The first cylindrical body 35 and the second cylindrical body 36 each have upper and lower openings that are large enough to at least stay out of the angle of view of the camera 34.

As illustrated in FIG. 4, the first cylindrical body 35 and the second cylindrical body 36 are provided with a first light source 37 and a second light source 38, respectively, annularly arranged along the inner surfaces thereof. The first light source 37 and the second light source 38 are arranged at upper locations of the respective cylinder bodies.

The first light source 37 and the second light source 38 include LEDs continuously arranged along the inner surfaces of the respective cylindrical bodies. The first light source 37 include LEDs emitting white light rays (first light rays), and the second light source 38 include LEDs emitting blue light rays (second light rays), the wavelength of each of which is shorter than that of the first light source. For example, the wavelength of a white light ray emitted from the first light source 37 is preferably within the range of visible light, that is, in the entire range from 400 to 700 nanometers or in the range of white light between the RGB line spectra. The wavelength of a blue light ray from the second light source 38 is preferably short, from 260 to 450 nanometers. The second light source 38 has small luminous energy, preferably, from three quarters to one quarter of that of the first light source 37. In this embodiment, the first light source 37 and the second light source 38 use LEDs; however, without being limited thereto, the light source can be any source emitting light with directivity, such as a laser. The wavelength is further selectable from ranges extended to ultraviolet and infrared regions.

The LED of the first light source 37 is disposed to emit white light with the optical axis of the light directed toward a direction perpendicular to the center axis O of the first cylindrical body 35, that is, toward the radial direction. The LED of the second light source 38 is disposed to emit blue light with the optical axis of the light directed downward, in the direction toward the product T.

Figure 5:
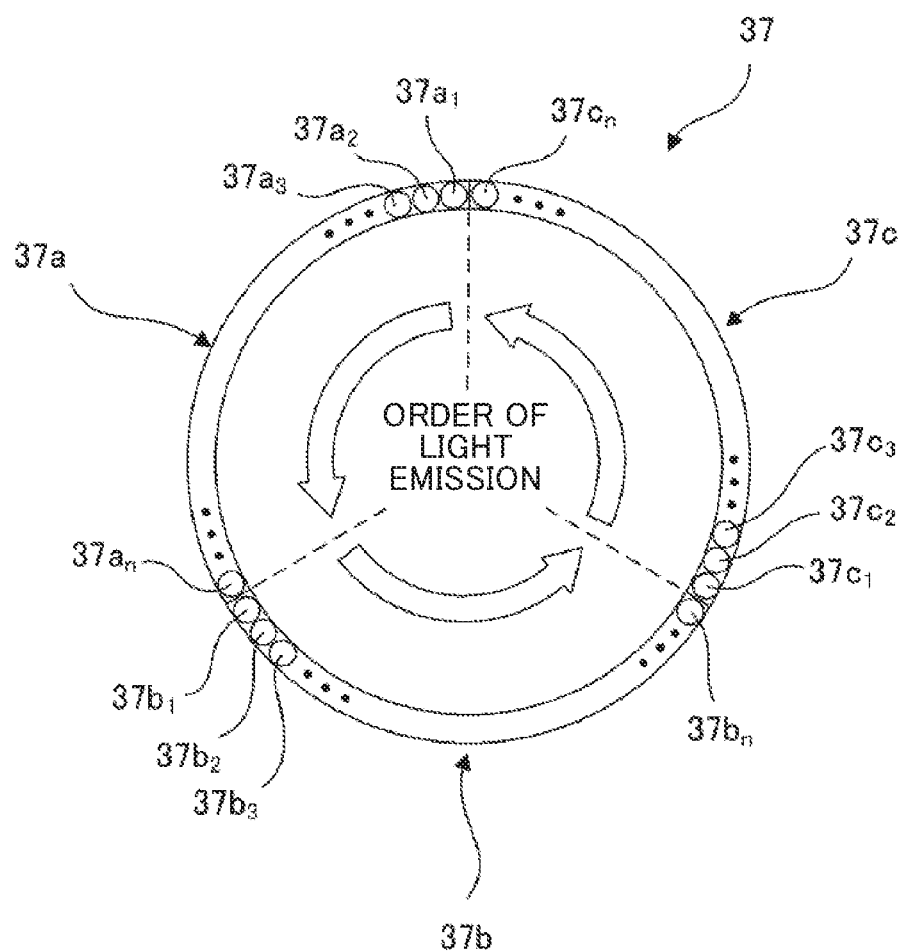
FIG. 5 is a plan view that illustrates the order of light emission in a first light source.

FIG. 5 is a plan view that illustrates the order of light emission in the first light source 37. As illustrated in FIG. 5, the first light source 37 is equally divided into three ranges 37a, 37b, and 37c in the circumferential direction. Each range includes a plurality of (in this embodiment, n LEDs) LEDs. The respective ranges include LEDs $37a_1$ to $37a_n$, $37b_1$ to $37b_n$, and $37c_1$ to $37c_n$. During one event of light emission, the first light source 37 causes the LEDs of the three ranges 37a, 37b, and 37c to sequentially emit light in the order from LEDs $37a_1$, $37b_1$, $37c_1$ located at ends of the respective ranges to LEDs $37a_n$, $37b_n$, and $37c_n$ located at the other ends of the ranges, in the circumferential direction. The time period of light emission of the first light source 37, more specifically, the time period from the start of light emission by LEDs $37a_1$, $37b_1$, $37c_1$ located at ends of the respective ranges 37a, and 37b, and 37c to the end of light emission by LEDs $37a_n$, $37b_n$, and $37c_n$ located at the other ends of the ranges, is set at a time period at least allowing imaging of the product T conveyed by a belt conveyor 4. For example, in this embodiment, the conveyance speed of the product T is 7 m/minute, whereas the time period of light emission of the first light source 37 is 1/1000 second. Although not illustrated, the second light source 38 is divided into three ranges, as with the first light source 37, and sequentially emits light in synchronization with the first light source 37.

The second cylindrical body 36 is disposed on an opening 30a that is substantially circularly open in the upper surface of the chamber box 30. The bottom surface of the chamber box 30 has a rectangular bottom window 30b, and the product T is conveyed under the bottom window 30b.

The above configuration makes the inner space of the imaging lighting device 2 a semi-dark room with the inner space covered with the chamber box 30 and the cover 31.

As illustrated in FIG. 4, the imaging control unit 21 of the controller 3 is electrically connected with the camera 34, the first light source 37, and the second light source 38 of the imaging lighting device 2. The imaging control unit 21 is connected with other devices such as a product detection sensor 39 for detecting the timing when the product T passes under the bottom window 30b.

In the appearance inspection device 1 configured as above, the imaging control unit 21 of the controller 3 controls the first light source 37 and the second light source 38 to start emitting light and the camera 34 to image the appearance of the product T at the timing when the product T is located directly under the bottom window 10b.

Figure 6:
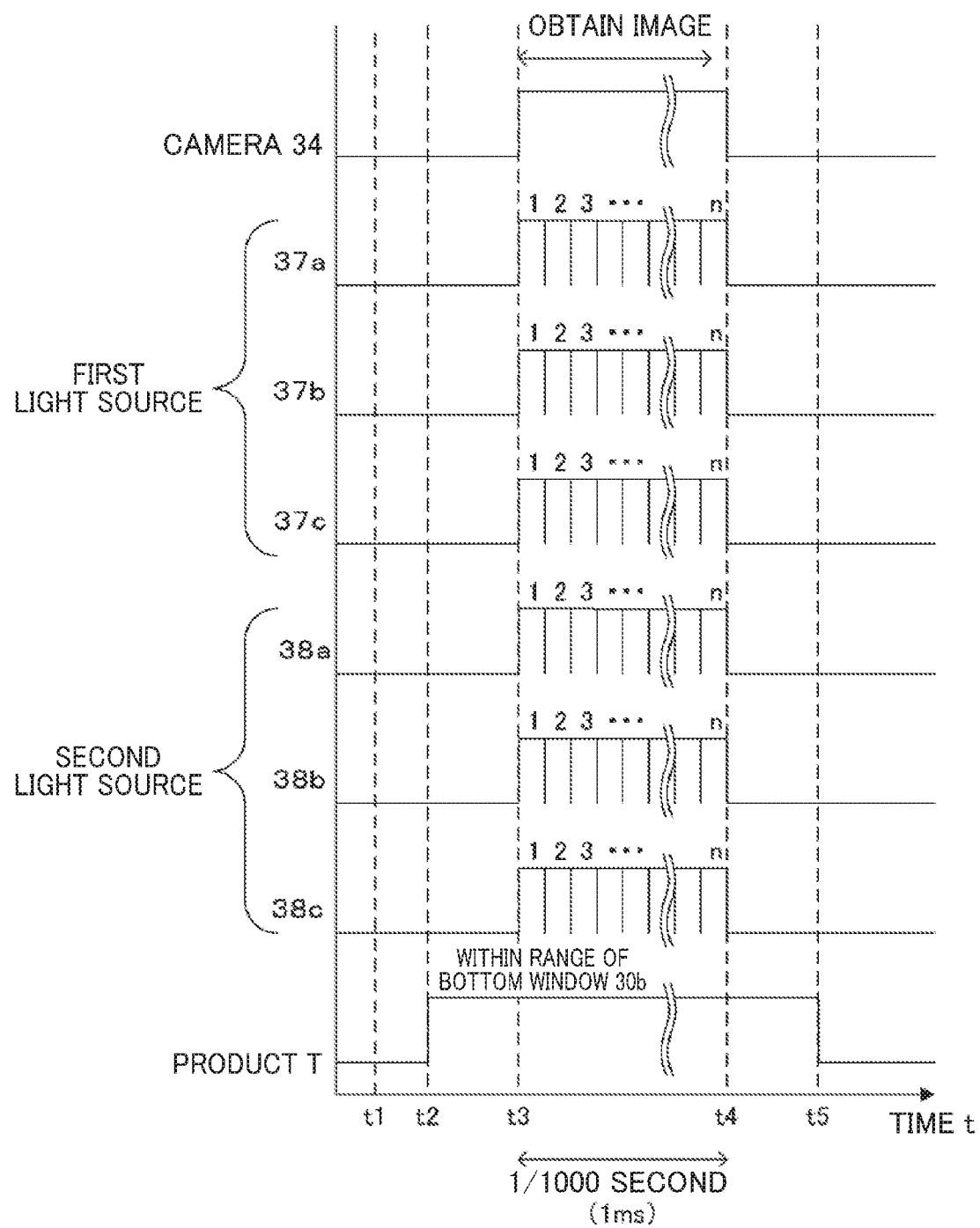
FIG. 6 is a sequence diagram relating to light emission of the first light source and a second light source and to imaging of a product with a camera.

FIG. 6 illustrates a sequence diagram relating to light emission of the first light source 37 and the second light source 38 and to imaging of the product T by the camera 34.

As illustrated in FIG. 6, the imaging control unit 21 of the controller 3 detects a product T1 entering the bottom window 30b, with the product detection sensor 39 (a time t1), and controls the first light source 37 and the second light source 38 to start emitting light at the timing when the product T1 passes over the center axis O (a time t3).

The first light source 37 and the second light source 38 cause n LEDs in three ranges 37a to 37c and 38a to 38c, respectively, to sequentially emit light, specifically, from the first LEDs located at ends to nth LEDs at the other ends of the ranges. The camera 34 obtains images, captured while the first light source 37 and the second light source 38 are emitting light (from the time t3 to a time t4), as images of the product T. FIG. 6 illustrates the time interval from the time t3 to the time t4 in an enlarged manner for easy understanding.

Imaging of one product T is completed (t5) when the product T comes out of the range of the bottom window 30b. In this manner, the camera 34 captures images of subsequently conveyed products T with the first light source 37 and the second light source 38 emitting light. The camera 34 is fixed with the physical shutter open, and images the object by having the first light source 37 and the second light source 38 emit light. In this configuration, the first light source 37 and the second light source 38 substantially function as shutters for the imaging field of view (the bottom window 30b) darkened by being surrounded by the chamber box 30, that is, a dark box.

Figure 7:
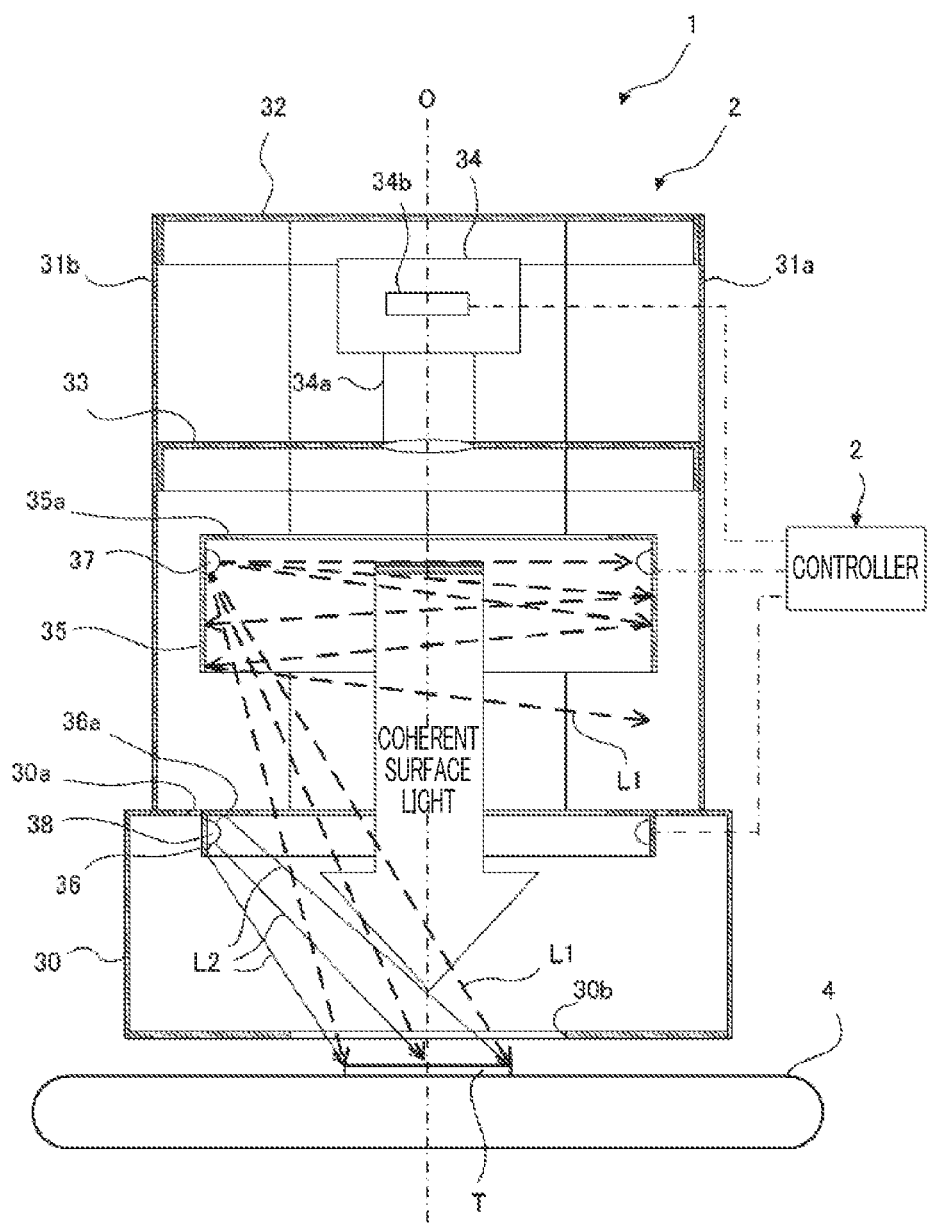
FIG. 7 is an illustrative drawing of optical paths of the first light source and the second light source.

FIG. 7 is an illustrative drawing of optical paths of white light rays L1 (the dotted lines) emitted from the first light source 37 and blue light rays L2 (the solid lines) from the second light source 38. The advantageous effects of the imaging lighting device 2 of this embodiment will now be described with reference to FIG. 7.

The first light source 37 is set with the optical axis directed toward the radial direction of the first cylindrical body 35. Since the inner peripheral surface of the first cylindrical body 35 is a silver surface, most of the white light rays L1 from the first light source 37 are repeatedly reflected on the light-reflective surface inside the first cylindrical body 35 and are turned into surface light with coherency (hereinafter, coherent surface light) and hit the product T. Most of the white light rays L1 proceeding toward the radial direction are turned into coherent surface light, which is a bundle of light rays having undergone repeated reflection on the inner light-reflective surface. The coherent surface light hits the surface of the product T at a high degree of dispersion compared to direct light.

Some of the white light rays L1 proceeding upward from the first light source 37 hit the black inner surface of the rib 35a formed at the upper end of the first cylindrical body 35 and are absorbed. Some of the white light rays L1 proceeding downward from the first light source 37 hit the product T as direct light having undergone no reflection inside the first cylindrical body 35. The angle of view and the location of the camera 34 are preferably determined such that at least reflection light generated with the white light rays L1 hitting the product T, that is, direct reflection light from the first light source 37 is not captured in the image.

The second light source 38 is set with the optical axis directed toward the product T. With this setting, when the second light source 38 emits light, most of the blue light rays L2 directly hit the surface of the product T. Since the second cylindrical body 36 and the rib 36a each have silver inner surfaces, some of the blue light rays L2 are reflected on the rib 36a and the inner peripheral surface once or several times and hit the product T. Furthermore, since the second light source 38 is located closer to the product T with respect to the first light source 37, direct light of the blue light rays L2 hits the product T at a larger angle with respect to the center axis O (the perpendicular to the surface of the product T), than the angle of direct light of the white light rays L1 to the center axis O.

As described above, most of the white light rays L1 emitted from the first light source 37 proceed toward the radial direction and are repeatedly reflected inside the first cylindrical body 35. The repeated reflection allows the imaging lighting device 2 to generate surface light with coherency, which is different from scattered light generated by a scattering board, and to irradiate the product T with this coherent surface light. Light emitted from the second light source 38 located closer to the product T hits the product T as direct light or as the blue light rays L2 reflected once or several times inside the second cylindrical body 36. The light can hit the product T at a larger angle with respect to the center axis O than the angle of direct light of the white light rays L1 to the center axis O. On the product T lit by the white light rays L1 and the blue light rays L2, the illumination hue varies at an inclined surface and a vertical surface of an uneven portion. The variation in hue allows various defects such as a crack, a chip, a scratch, a cut, and a dent of the product T to be lit up. The camera 34 images the product T in this condition, and can obtain such an image from which various types of defect can be separated by using the difference in hue.

The light source 37 emits the white light rays L1; whereas the second light source 38 emits the blue light rays L2 having shorter wavelengths than those of the white light rays L1. The white light rays L1 allow the product T to be lit up in a largest visible range, and the blue light rays L2 allow damages such as flaws to be extracted at higher resolution. This structure therefore allows more types of flaw to be exactly separated on the product T.

In addition, in each of the first light source 37 and the second light source 38, light is sequentially emitted in the three divided ranges. With the range emitting light without directly facing another range, this structure can reduce damage to the image quality, caused due to light from the facing position, such as a reduction in resolution, occurrence of lens flare and ghost, and light diffraction. This structure therefore allows a flaw of the product T to be further clearly lit up.

The first cylindrical body 35 includes the rib 35a having a black inner surface. This structure is beneficial in efficiently generating coherent surface light directed toward the product T while reducing the white light rays L1 directed toward the camera 34.

The rib 36a of the second cylindrical body 36 allows the blue light rays L2 to equally reach the center of the product T.

Of the white light rays L1 and the blue light rays L2, light reflected on the surface of the product T is received by an imaging device 34b through the lens 34a of the camera 34, whereby the product T is imaged. The camera 34 images the product T by having the first light source 37 and the second light source 38 emit light, with the movable parts fixed. The camera 34 is capable of obtaining image data adapted to distributions of color sensitivity possessed by a human eye. In this manner, image data for inspection at the visual inspection level is created.

The controller 3 of the appearance inspection device 1 carries out inspection processing based on the image data captured as above, thereby achieving inspection at the visual inspection level.

Specifically, color space processing is performed on obtained image data to detect defects on the surface of the product T, the details of which will be described later. This manner enables more accurate detection of various defects.

The appearance inspection device 1 is capable of imaging the product T within a short time period in which the first light source 37 and the second light source 38 are emitting light and conducting the inspection processing based on the image data. This operation enables inspection to be carried out in the flow of the production line without stopping the belt conveyor 4. This configuration thus can improve the efficiency of inspection operation.

Based on image data captured by the imaging lighting device 2, the controller 3 learns quality assessment and assesses the product quality as described below in detail.

Figure 8:
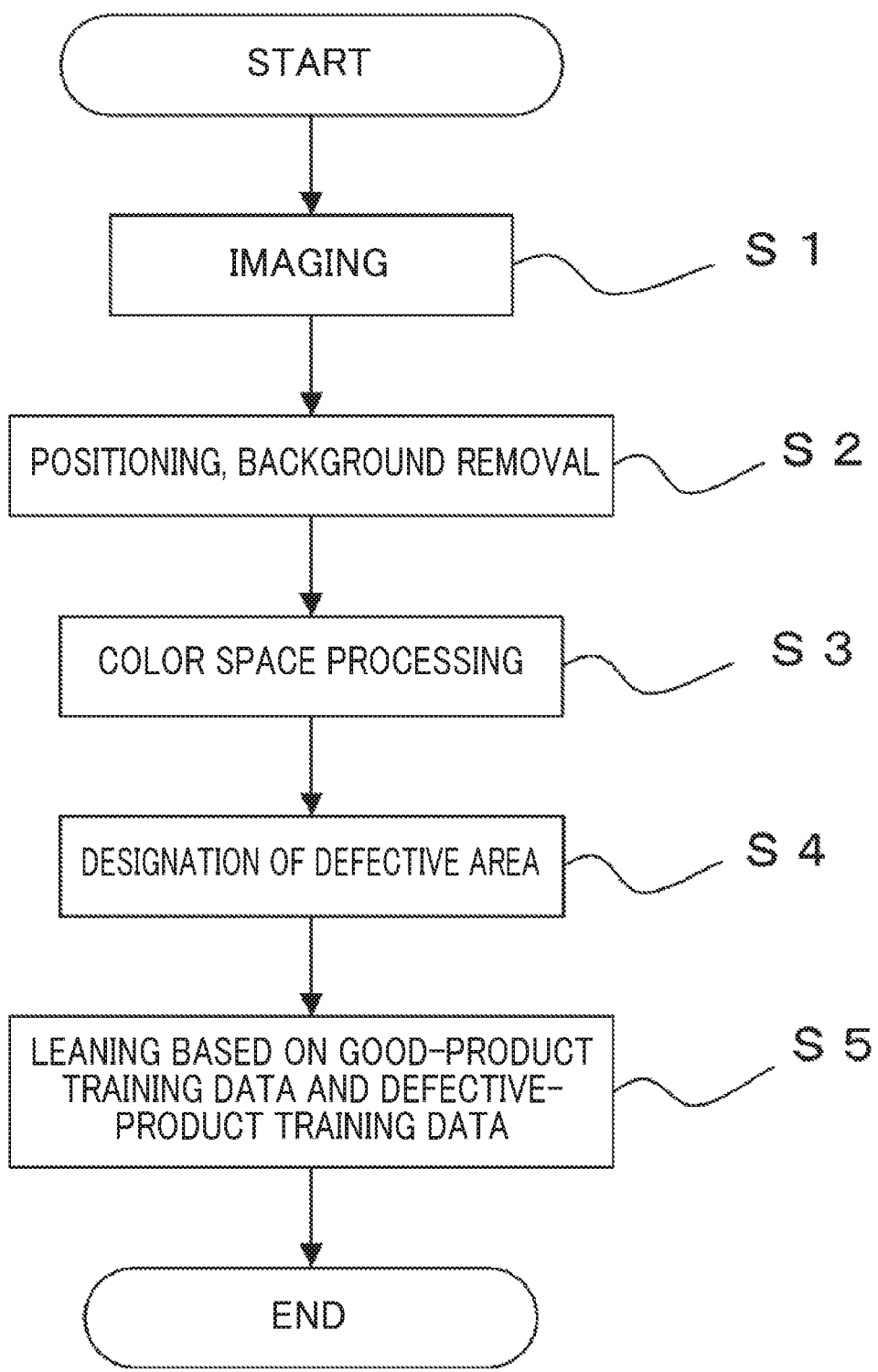
FIG. 8 is a flowchart of a learning routine carried out by a controller.
Figure 9:
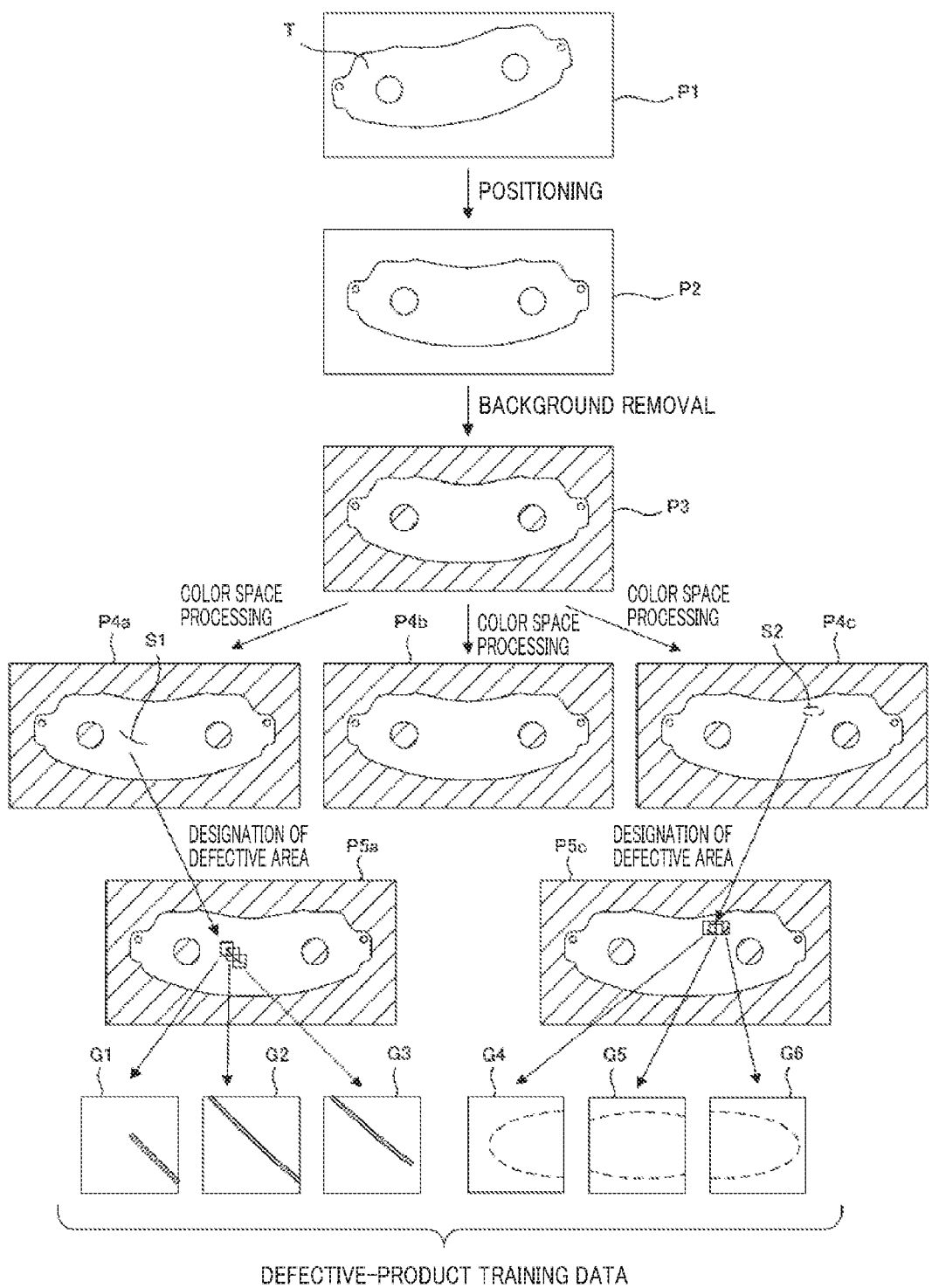
FIG. 9 is an illustrative drawing that depicts transition of image data in a learning process.

FIG. 8 is a flowchart of a learning routine carried out by the controller 3, and FIG. 9 is an illustrative drawing that depicts transition of image data of FIG. 8. The learning procedure through which the controller 3 learns quality assessment of the product T will now be described with reference to the flowchart of FIG. 8. Transition of image data will be thereafter described with reference to the example images of FIG. 9.

At Step S1 of FIG. 8, the imaging control unit 21 of the controller 3 controls the imaging lighting device 2 to image the product T and obtains image data.

At Step S2, the preprocessing unit 22 of the controller 3 recognizes the outer shape of the product T included in the obtained image data, positions the image data at a location substantially the same as that of a predetermined reference image, and removes the background.

At Step S3, the color space processing unit 23 of the controller 3 performs color space processing on the image data and creates a plurality of color space processing images.

At Step S4, the defective area designation unit 24 of the controller 3 outputs the color space processing images to the output unit 13. In the presence of a defective area in the image, an operator designates the defective area by the grid, and defective-product training data is created for the grids including the defective area. The color space processing image with no defective areas designated is classed into good-product training data. The defective-product training data and the good-product training data are stored in the storage unit 11.

At Step S5, based on the defective-product training data and the good-product training data created by the defective area designation unit 24 and stored in the storage unit 11, the learning unit 25 of the controller 3 learns the quality assessment of the product T through machine learning and creates a learned model. For efficiency, the process of Step S5 is preferably carried out with more than a certain number of defective-product training data pieces and good-product training data pieces accumulated in the storage unit 11. Instead of this, the learning process of Step S5 may be carried out at every creation of a defective-product training data piece or a good-product training data piece.

Image data transition in learning will now be described with reference to FIG. 9.

An image P1 of FIG. 9 is image data captured by the imaging lighting device 2. As indicated by the image P1, the position and the direction of the product T are not always consistent when the image is captured by the imaging lighting device 2. The product T may be positioned at a shifted location in the image or may be inclined with respect to the image frame.

As indicated by image P2, the preprocessing unit 22 positions the product T such that the product T is located at the center of the image in a right posture, by referring to the reference image (Step S2). Furthermore, the preprocessing unit 22 removes the background area of the product T indicated by hatching in the image P3 (Step S2).

The color space processing unit 23 performs color space processing on the image P3 and creates color space processing images from one image (Step S3). FIG. 9 illustrates three types of color space processing images including a first color space processing image P4a to a third color space processing image P4c. As described above, in the color space processing images P4a, P4b, and P4c, defects such as a flaw and a dent are emphasized for display depending on a selected wavelength. For example, a flaw S1 in a V-shaped groove is emphasized in the first color space processing image P4a, and a dent S2 is emphasized in the third color space processing image P4c. The second color space processing image P4b has no specific defects.

As indicated by the images P5a and P5c of FIG. 9, the defective area designation unit 24 outputs the color space processing images P4a, P4b, and P4c to the output unit 13, and the operator designates defective areas using the input unit 12 to extract the defective areas by the grid (Step S4). For example, in the image P5a of FIG. 9, the flaw S1 in a V-shaped groove is extracted from an end to the other end thereof by designating a first grid G1 to a third grid G3. In the image P5c, a fourth grid to a sixth grid are designated to extract the entire image of the dent S2. The designated grids G1 to G6 of FIG. 9 are stored in the storage unit 11 as defective-product training data (Step S4).

Such defects emphasized on the color space processing images are accumulated by the grid as the defective-product training data and used for machine learning of the learning unit 25 (Step S5).

FIG. 9 illustrates three color space processing images and six grids of defective areas; however, neither the number of color space processing images created by the color space processing nor the number of defective areas is limited thereto. Defective areas may be designated in a circle or any other shapes or by any other methods capable of designating areas, instead of using the grid.

Figure 10:
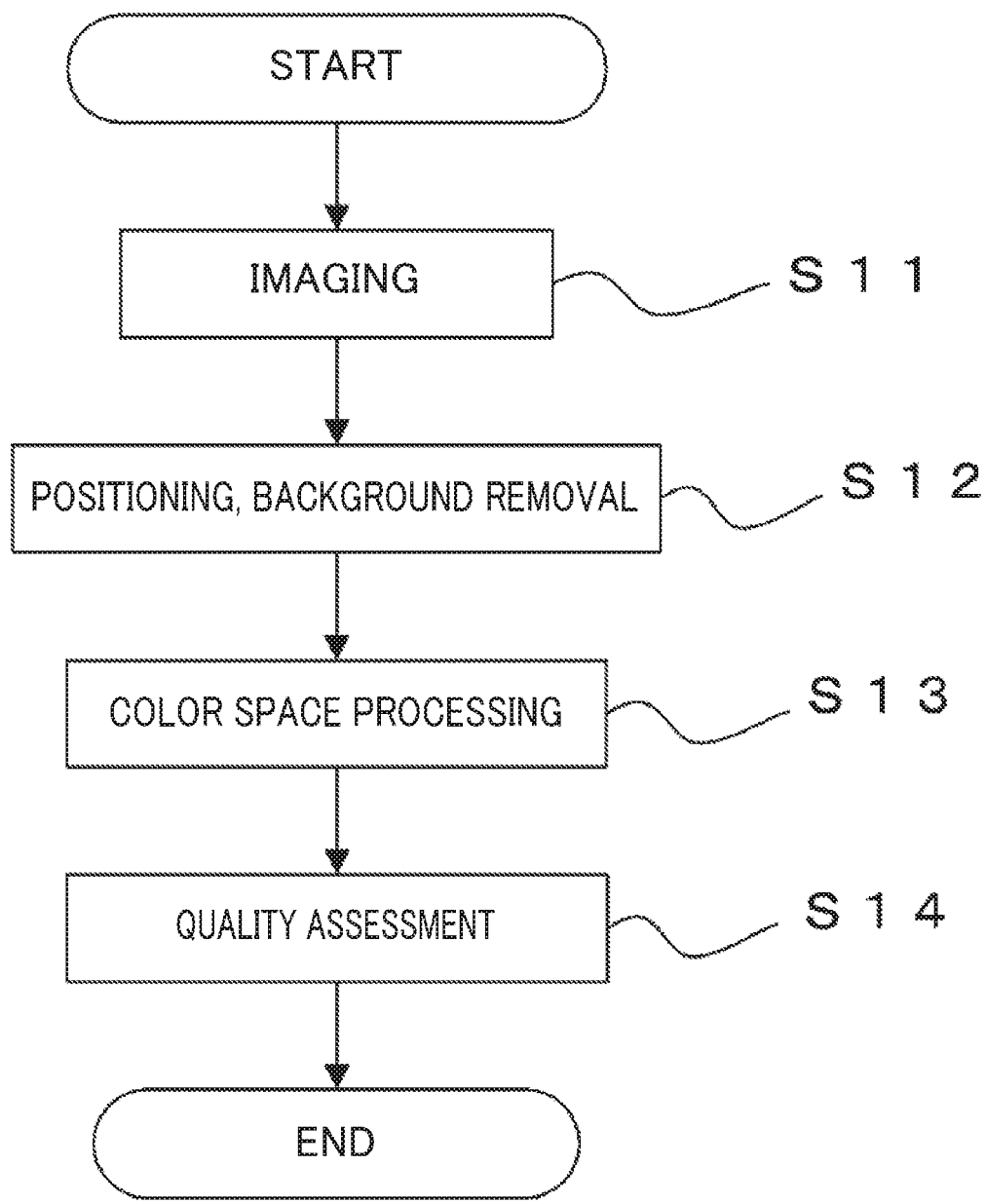
FIG. 10 is a flowchart of an assessment routine conducted by the controller.

FIG. 10 is a flowchart of an assessment routine carried out by the controller 3. With reference to the flowchart, the procedure of quality assessment of the product T will now be described.

Steps S11 to S13 in FIG. 10 are substantially the same processing steps as Steps S1 to S3 in FIG. 8. The steps include imaging by the imaging lighting device 2 (S11), positioning of the image data and background removal therefrom (S12), and transformation into a color space processing image (S13).

At Step S14, the assessment unit 26 of the controller 3 assesses whether the product T displayed on the input color space processing image to be good or defective, using a learned assessment model, and outputs the result to the output unit 13.

As described above, the appearance inspection device 1 of this embodiment causes the controller 3 to obtain an image captured by the imaging lighting device 2, and to create a color space processing image where a defect of the product T is emphasized, thereby accurately and efficiently conducting inspection of the product T at the visual inspection level.

More specifically, the color space processing unit 23 creates a plurality of color space processing images having different wavelengths on the color space, which allows various types of defect such as a flaw and a dent, characterized by the wavelength, to be emphasized. By referring to the created color space processing images, various defects of the product T can be detected as if observed from various angles in visual inspection.

The assessment unit 26 makes a quality assessment of the product T using the learned model, obtained through machine learning of the quality assessment of the product T based on the color space processing images. This operation enables more accurate and efficient inspection without depending on operators.

The preprocessing unit 22 positions the product T in the image, which can ensure consistency in the position among the images of the product T. Moreover, background removal can extract only information of the product T. Such preprocessing can improve the efficiency and accuracy of learning by the learning unit 25. The assessment unit 26 thus can make more accurate and efficient assessment.

The product T is imaged by the imaging lighting device 2 including the first light source 37 for irradiating the product T with the above-described coherent surface light, the second light source 38 for irradiating the product T with light including direct light, and the camera 14 for imaging the product T lit up by those light sources. This configuration can obtain image data from which various types of defect can be extracted using the difference in hue. The image further undergoes the color space processing, which can create various clear color space images. Such created images can enhance accuracy of inspection.

As described above, the appearance inspection device 1 of this embodiment is capable of detecting various types of defect of the product T and is thus capable of conducting more accurate and efficient inspection at the visual inspection level.

An embodiment of the present disclosure has been described as above. It should be noted that the aspects of the present disclosure are not limited to this embodiment.

In the above embodiment, the product T as a test object is a plate of a brake pad. The test object is not limited thereto, and various products can be the test objects. Furthermore, although inspection of the above embodiment is a quality assessment based on defects such as a flaw and a dent, the purpose of inspection is not limited to quality assessment. Any purpose is applicable for inspection to make a determination by emphasizing predetermined characteristics of an object using color space processing.

In the above embodiment, the assessment unit 26 is configured to make a quality assessment of the product T using a learned model, obtained through machine learning of the quality assessment of the product T using the color space processing images; however, the assessment unit 26 is not necessarily configured as above. For example, the assessment unit may be configured such that an operator makes a quality assessment with the input unit, on the color space processing images output to the output unit. For such a configuration in which an operator makes a quality assessment based on color space processing images with defects of the object emphasized, use of the color space processing image is beneficial for the operator to make a more accurate and easier assessment and to improve the efficiency of inspection.

In the above embodiment, the controller 3 conducts inspection processing (quality assessment) of an object based on image data captured by the imaging lighting device 2. The image data used for quality assessment of the controller 3 is not necessarily image data captured by the imaging lighting device of the embodiment. The inspection processing may be performed using image data captured by another device.

The imaging lighting device 2 is not necessarily configured to provide image data to the controller of the above embodiment and may be configured to provide image data to another device.

The first cylindrical body 35 of the above embodiment has the rib 35a at the upper end thereof. The first cylindrical body 35 may be completely cylindrical with no ribs.

Figure 11:
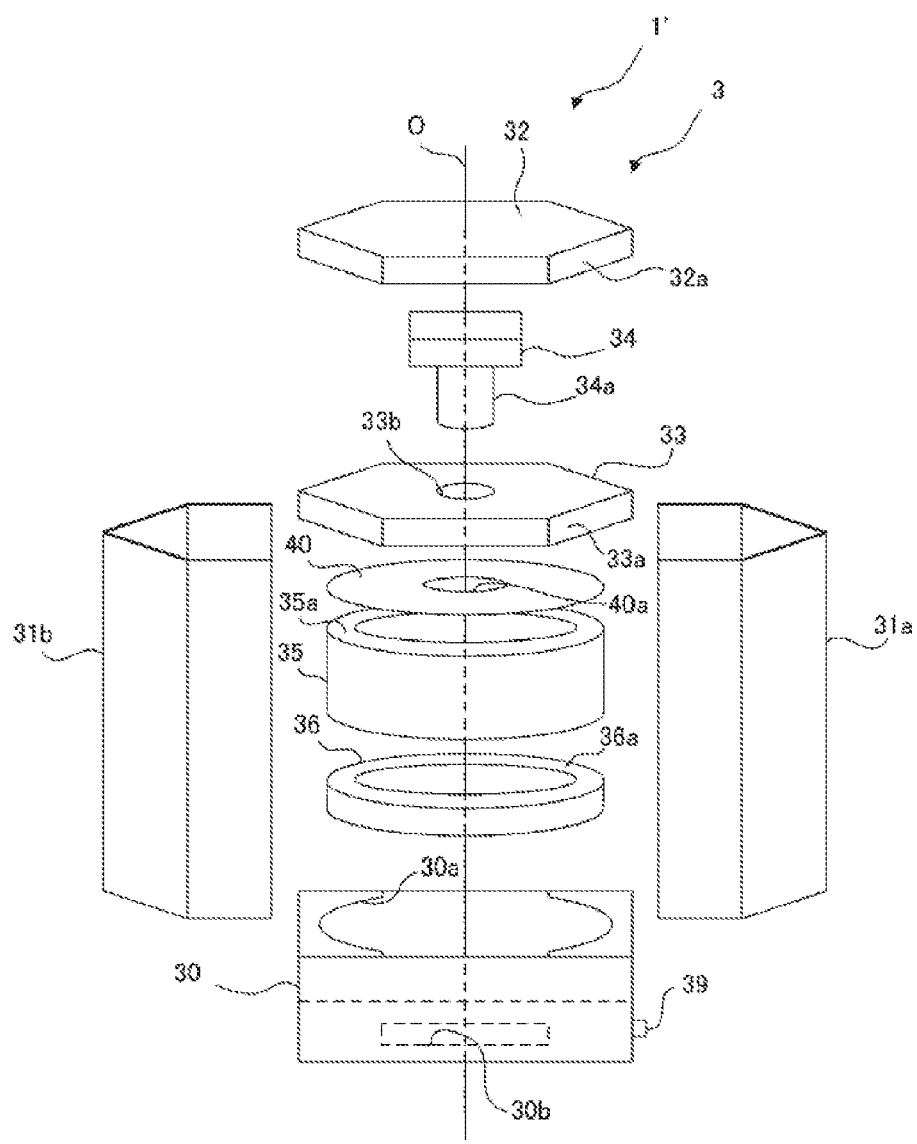
FIG. 11 is an exploded view of an imaging lighting device according to a modification.

The first cylindrical body 35 may have its upper end opening covered with a reflection board. As a modification of the above embodiment. FIG. 11 gives an exploded view of an imaging lighting device with a reflection board. For components other than a reflection board 40, like components of the above embodiment are indicated by like reference numerals, and description thereof will be omitted.

As illustrated in FIG. 11, an appearance inspection device 1' of the modification has the reflection board 40 attached to the upper end opening of the first cylindrical body 35. The reflection board 40 is a circular board having the same diameter as that of the first cylindrical body 35, and has a hole 40a at the center thereof that is at least larger than the angle of view of the camera 34. The surface (lower surface), of the reflection board 40, closer to the first cylindrical body 35 is a light-reflective silver surface. In this modification, the rib 35a of the first cylindrical body 35 has a silver inner surface.

The reflection board 40 attached to the upper end opening of the first cylindrical body 35 reflects some of the white light rays L1 proceeding upward from the first light source 37 and directs the light rays downward. This structure therefore increases the quantity of the coherent surface light, generated by repeated reflection inside the first cylindrical body 35, and allows more intense light to hit the product T.

This configuration thus can light up the center of the product T with more light, compared to, for example, the configuration of the above embodiment, and further allows fine flaws, detection of which is unnecessary, to be less conspicuous.

As described in the embodiment, providing the rib 35a having a black inner surface to the upper end opening of the first cylindrical body 35 is beneficial in reducing the quantity of light. As described in the modification, providing the reflection board 40 to the same is beneficial in increasing the quantity of light. Formation of a light quantity adjustment unit such as the rib 35a and the reflection board 40 on the upper end opening of the first cylindrical body 35 is beneficial in adjusting the quantity of coherent surface light, depending on, for example, the type of test object, the conditions of the object surface, and the type of flaw to be detected.

In the above modification, the reflection board 40 is separately prepared from the first cylindrical body 35. In another example, the reflection board 40 instead of the rib may be integrally formed with the first cylindrical body.

In the above embodiment, each of the first light source 37 and the second light source 38 is divided into three ranges in the circumferential direction, and light is sequentially emitted in each of the ranges. Division into three ranges is most preferable in exerting the above advantageous effects. Instead of this, the light source may be divided into another number of ranges, or may be a whole without being divided. In this case, the number of divided ranges is preferably three, five, or the like, which does not allow the ranges emitting light to face each other.

In the embodiment, the imaging lighting device 2 of the appearance inspection device 1 is placed on the belt conveyor 4, and the product T as a test object is moved with respect to the imaging lighting device 2. As another example, if the product is an object difficult to be moved, the imaging lighting device may be moved with respect to the product.

DESCRIPTION OF REFERENCE CHARACTERS

1, 1' Appearance Inspection Device
2 Imaging Lighting Device
3 Controller
4 Belt Conveyor (Conveyor Unit)
10 Arithmetic Unit
11 Storage Unit
12 Input Unit
13 Output Unit
21 Imaging Control Unit (Image Input Unit)
22 Preprocessing Unit
23 Color Space Processing Unit
24 Defective Area Designation Unit
25 Learning Unit
26 Assessment Unit
30 Chamber Box
31 (31a, 31b) Cover
32 Top Plate
33 Intermediate Plate
34 Camera (Imaging Unit)
35 First Cylindrical Body
36 Second Cylindrical Body
37 First Light Source
38 Second Light Source
39 Product Detection Sensor
40 Reflection Board
T Product
O Center Axis
L1 White Light Ray (First Light Ray)
L2 Blue Light Ray (Second Light Ray)

The invention claimed is:

1. A lighting device to light up an object, the lighting device comprising:
a first cylindrical body having an inner light-reflective surface allowing repeated reflection inside the first cylindrical body and disposed such that an object is located on an extension of a center axis;

a first light source annularly arranged on the inner light-reflective surface of the first cylindrical body and configured to emit a first light ray;
a second cylindrical body disposed closer to the object with respect to the first cylindrical body and formed in a cylindrical shape coaxial with the first cylindrical body; and
a second light source annularly arranged on an inner surface of the second cylindrical body and configured to emit a second light ray,
wherein an annular rib projecting toward the center axis is provided on an edge, of the first cylindrical body, away from the object,
wherein the object is irradiated with surface light with coherency, which is generated by repeated reflection of the first light ray, emitted from the first light source, inside the first cylindrical body, and irradiated with direct light of the second light emitted from the second light source and with reflection light of the second light reflected inside the second cylindrical body.

2. The lighting device of claim 1, wherein the second light source emits a light ray a wavelength of which is shorter than a wavelength of a light ray from the first light source.

3. The lighting device of claim 1, wherein the first light source emits the first light ray which is a white light ray, and the second light source emits the second light ray which is a blue light ray.

4. The lighting device of claim 1, wherein each of the first light source and the second light source includes a plurality of light sources.

5. The lighting device of claim 4, wherein each of the first light source and the second light source is divided into a plurality of ranges in a circumferential direction, and the light sources included in the respective ranges sequentially emit light in a circumferential direction in a synchronous manner.

6. The lighting device of claim 5, wherein each of the first light source and the second light source is divided into the number of ranges that does not allow the ranges emitting light to face each other in a radial direction.

7. The lighting device of claim 1, wherein an inner surface of the annular rib is black or silver.

8. The lighting device of claim 1, wherein the second cylindrical body has an annular rib projecting toward the center axis, on an edge, of the second cylindrical body, away from the object.

9. The lighting device of claim 1, wherein: the first light source is set with an optical axis of the first light source directed toward a radial direction of the first cylindrical body, and the second light source is set with an optical axis of the second light source directed toward the object.

10. An appearance inspection device comprising:
the lighting device to light up an object according to claim 1;
an imaging unit disposed on extension of center axes of the first cylindrical body and the second cylindrical body and configured to image the object lit by the lighting device; and
a controller configured to conduct inspection processing on the object by performing color space processing through color profile transform on an image captured by the imaging unit.

11. The appearance inspection device of claim 10, wherein the controller conducts the inspection processing on the object, using a gamut including a band of wavelengths causing optical interference of the image on which the color space processing is performed.

12. The appearance inspection device of claim 11, further comprising a conveyor unit configured to relatively move the imaging unit or the object so that the object to be inspected can be imaged by the imaging unit.

13. The appearance inspection device of claim 10, further comprising:
an image input unit configured to receive an input of an image including the object imaged by the imaging unit;
a color space processing unit configured to provide color space processing, for emphasizing a predetermined characteristic of the object, on the image input to the image input unit, and to create a color space processing image; and
an assessment unit configured to make a quality assessment on the object based on the color space processing image.

14. The appearance inspection device of claim 13, wherein the color space processing unit performs color space processing, and creates a plurality of color space processing images including the color space processing image and having respective different wavelengths on a color space.

15. The appearance inspection device of claim 13, wherein the assessment unit makes the quality assessment on the object using a learned model, obtained through machine learning of the quality assessment on the object, using the color space processing image.

16. The appearance inspection device of claim 13, further comprising a preprocessing unit configured to position the object and remove background of the object, in the image input to the image input unit, prior to the color space processing of the color space processing unit.

17. A lighting device to light up an object, the lighting device comprising: a first cylindrical body having an inner light-reflective surface allowing repeated reflection inside the first cylindrical body and disposed such that an object is located on an extension of a center axis, the first cylindrical body including a circular board having a hole at a center, on an opening of the first cylindrical body, away from the object;
a first light source annularly arranged on the inner light-reflective surface of the first cylindrical body and configured to emit a first light ray;
a second cylindrical body disposed closer to the object with respect to the first cylindrical body and formed in a cylindrical shape coaxial with the first cylindrical body, the second cylindrical body including the annular rib projecting toward the center axis on an edge of the second cylindrical body away from the object; and
a second light source annularly arranged on an inner surface of the second cylindrical body and configured to emit a second light ray, wherein the object is irradiated with surface light with coherency, which is generated by repeated reflection of the first light ray, emitted from the first light source, inside the first cylindrical body, and irradiated with direct light of the second light emitted from the second light source and with reflection light of the second light reflected inside the second cylindrical body.

18. The lighting device of claim 17, wherein each of the first light source and the second light source includes a plurality of light sources, and is divided into a plurality of ranges in a circumferential direction, the light sources included in the respective ranges sequentially emitting light in the circumferential direction in a synchronous manner.

19. The lighting device of claim 1, wherein the first cylindrical body and the second cylindrical body are spaced from each other in a direction of the center axis.

20. The lighting device of claim 1, wherein a diameter of the second cylindrical body is larger than the object and equal to or smaller than a diameter of the first cylindrical body.

21. The lighting device of claim 17, wherein an inner surface of the circular board is black or silver.

* * * * *